United States Patent [19]

Adamson et al.

[11] Patent Number: 4,916,894
[45] Date of Patent: Apr. 17, 1990

[54] HIGH BYPASS TURBOFAN ENGINE HAVING A PARTIALLY GEARED FAN DRIVE TURBINE

[75] Inventors: Arthur P. Adamson; Lawrence Butler, both of Cincinnati, Ohio

[73] Assignee: General Electric Company, Cincinnati, Ohio

[21] Appl. No.: 294,091

[22] Filed: Jan. 3, 1989

[51] Int. Cl.[4] ............................................. F02K 3/04
[52] U.S. Cl. ................... 60/226.1; 60/39.161; 60/39.162; 416/171; 74/DIG. 5
[58] Field of Search .................. 60/226.1, 268, 39.161, 60/39.162; 416/171, 170 R, 129, 128; 415/65, 66, 67, 68, 69; 74/DIG. 5

[56] References Cited

U.S. PATENT DOCUMENTS

| | | | |
|---|---|---|---|
| 3,673,802 | 7/1972 | Krebs et al. | 60/268 |
| 3,729,957 | 5/1973 | Petrie et al. | 60/39.162 |
| 4,005,575 | 2/1977 | Scott et al. | 60/268 |
| 4,159,624 | 7/1979 | Gruner | 60/39.162 |
| 4,251,987 | 2/1981 | Adamson . | |
| 4,827,712 | 5/1989 | Coplin | 60/39.161 |

FOREIGN PATENT DOCUMENTS 2198791  6/1988  United Kingdom ............ 416/170 R

Primary Examiner—Donald E. Stout
Attorney, Agent, or Firm—Jerome C. Squillaro; Steven J. Rosen

[57] ABSTRACT

The present invention provides a high bypass turbofan engine configuration wherein a fan drive turbine is divided into first and second turbine sections mounted for independent rotation within the engine frame. The first, higher pressure, higher speed turbine section is coupled to the fan section drive shaft via a gear box which reduces the rotational speed of the power delivered by the higher pressure first turbine section to match the design rotational speed of the fan section. The second turbine section, having a larger diameter and lower rotational speed as compared to the first turbine section, is directly connected to the fan section and drives the fan section at the same rotational speed as that of the second turbine section. In this manner, the fan drive shaft horsepower is provided while reducing the weight and size of the necessary gearing between the fan drive turbine and the fan. The weight and size of the fan drive turbine and the booster compressor are also reduced.

15 Claims, 3 Drawing Sheets

HIGH BYPASS TURBOFAN ENGINE HAVING A PARTIALLY GEARED FAN DRIVE TURBINE

BACKGROUND OF THE INVENTION

1. Field of the Invention

The present invention relates to high bypass turbofan engines and, more specifically, to a high bypass turbofan engine having a fan drive turbine which is partially geared to match the speed of rotation of the fan.

2. Description of the Related Art

As the bypass ratio of a turbofan engine increases, the amount of air moved by the fan section increases relative to the amount of air received by the core engine. In such a situation the fan section diameter becomes larger relative to the core diameter. As the fan diameter increases the optimum tip speed of the fan decreases. The combination of the larger diameter fan section and the requirement for a lower fan tip speed tends to cause the required number of fan drive turbine stages to increase due to the lower turbine rotational speed and the thermodynamic power cycle of the turbine, thus increasing the cost and weight of the engine. The high power extraction from the turbine stream requires large expansion of the turbine gas and hence a large turbine exit annulas area.

The conventional solution to this problem was to insert a speed changing gear box between the fan drive turbine section and the fan section. However, such an arrangement has substantial drawbacks. The fan drive turbine though requiring fewer stages still requires the same large exit annulus area due to the power extraction requirement for the thermodynamic cycle of the turbine, and, therefore, its speed is limited by stress in the last stage of the fan drive turbine. Hence, the turbine remains at a relatively large diameter with a significant number of stages. Secondly, the gear box between the fan drive turbine and the fan section is relatively heavy, inefficient, expensive and requires substantial maintenance due to its large shaft horsepower output and lower output speed.

SUMMARY OF THE INVENTION

Accordingly, it is an object of the present invention to provide a turbofan engine with a high bypass ratio wherein the required number of fan drive turbine stages is reduced while still meeting the optimum tip speed for the fan section.

It is a further object of the present invention to provide an arrangement in a high bypass turbofan engine wherein the fan drive turbine is split into at least two sections with one of the sections having a rotational speed which substantially matches the optimum rotational speed of the fan section such that the fan section may be directly driven by the lower speed fan drive turbine section.

It is a further object of the present invention to provide a fan drive turbine section in a high bypass ratio turbofan engine wherein only the higher speed section of the fan drive turbine is coupled to a reduction gear, and the weight and size of the reduction gear box can be efficiently reduced.

Additional objects and advantages of the invention will be set forth in the description which follows, and in p art will be obvious from the description, or may be learned by practice of the invention. The objects and advantages of the invention may be realized and attained by means of the instrumentalities and combinations particularly pointed out in the appended claims.

To achieve the foregoing objects, and in accordance with the purposes of the invention as embodied and broadly described herein, a high bypass ratio turbofan engine is provided comprising, a fan section, and a fan drive turbine means for driving the fan section. The fan drive turbine means is split into first and second turbine sections mounted for independent rotation within the engine. Fan drive shaft means are provided for rotating the fan section. The engine further includes means for coupling the fan drive shaft means to the second turbine section of the fan drive turbine means to turn the fan section at substantially the same rotational speed as the second turbine section. There is further provided gear means for coupling the first turbine section of the fan drive turbine means to the fan drive shaft means, and for reducing the rotational speed at which power is delivered from the first turbine section to match the rotational speed of the fan section. Preferably, the shaft horsepower of the fan drive shaft means is split substantially evenly between the first and second turbine sections.

In a second embodiment of the present invention, the higher rotational speed first turbine section of the fan drive turbine means is coupled to a booster compressor disposed aft of the fan section and forward of a core engine section such that the booster compressor may be driven at substantially the same rotational speed as the first turbine section of the fan drive turbine means.

The configuration of the turbofan engine of the present invention as broadly described above provides the advantage of being able to directly drive the fan section and/or the booster compressor at the same rotational speed as a respective one of the second and first turbine sections of the fan drive turbine means to thereby eliminate or reduce the requirement for gearing between the fan drive turbine section and its associated coupled driven components.

BRIEF DESCRIPTION OF THE DRAWINGS

The accompanying drawings, which are incorporated in and constitute a part of the specification, illustrate preferred embodiments of the invention and together with the general description given above and the detailed description of the preferred embodiments given below, serve to explain the principles of the invention. In the drawings.

DESCRIPTION OF THE PREFERRED EMBODIMENTS

Figure 1:
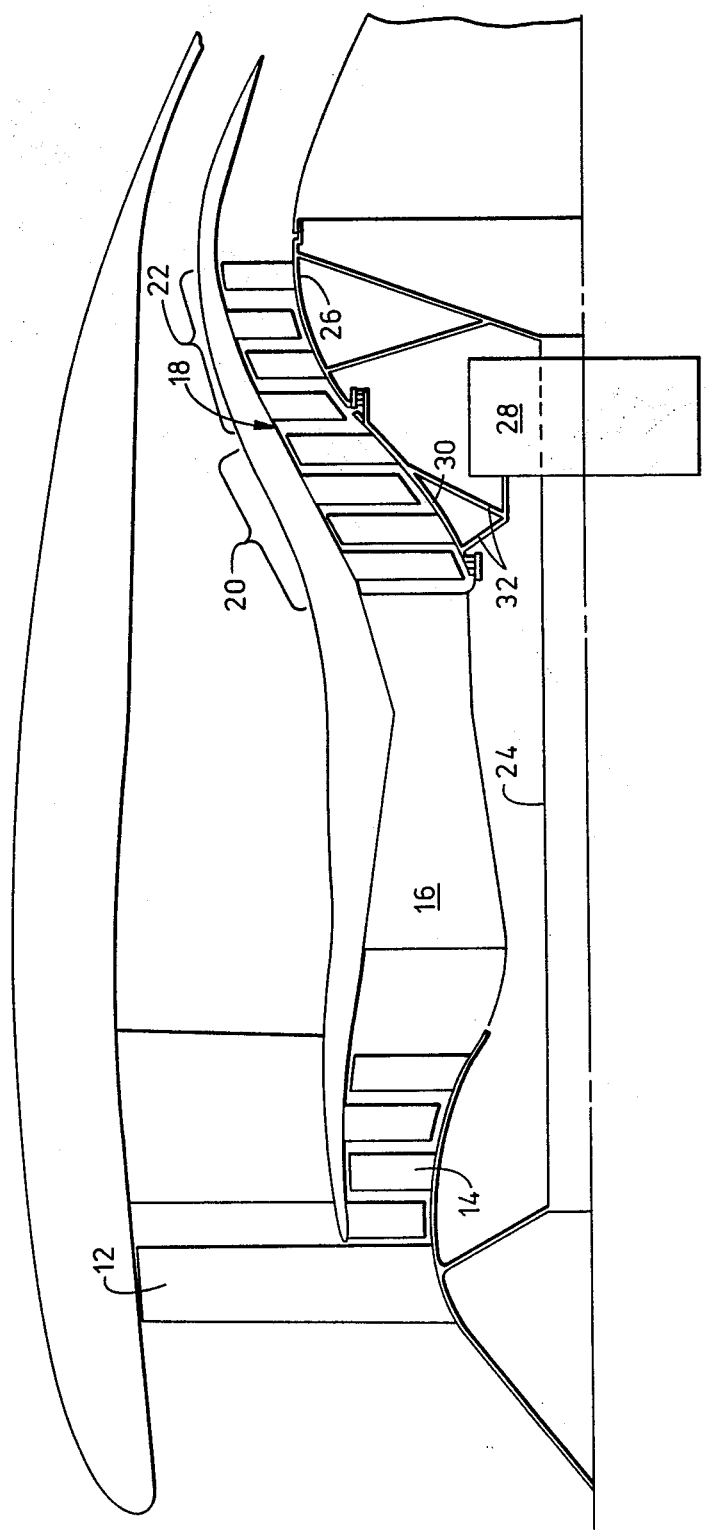
FIG. 1 schematically illustrates a turbofan engine incorporating the teachings of the present invention wherein the gear means connecting the first turbine section to the fan drive shaft means is disposed aft of the core section.

Reference will now be made in detail to the preferred embodiments of the invention as illustrated in the accompanying drawings, in which like reference characters designate like or corresponding parts throughout the several drawings.

FIG. 1 illustrates schematically a high bypass ratio turbofan engine generally referred to as 10. In accordance with the present invention engine 10 includes a fan section 12, and a booster compressor 14 disposed forward of a core engine section 16 relative to the flow of combustion gases through the engine. Core section 16 typically includes a conventional high pressure compressor feeding combustion chambers which direct hot combustion gases through a high pressure turbine in a manner known to those of skill in the art.

In accordance with the present invention engine 10 further includes fan drive turbine means for driving the fan section. As embodied herein, the fan drive turbine means includes fan drive turbine 18 which is split into first and second turbine sections 20 and 22 mounted for independent rotation within engine 10. First turbine section 20 is disposed forward of second turbine section 22. Each of first and second turbine sections 20 and 22 include a predetermined number of stages. Second turbine section 22 has a larger diameter than first turbine section 20 to provide the large annulus area required to meet the power requirements dictated by the thermodynamic cycle of the turbine means, as will be well understood by those skilled in the art. Second turbine section 22 preferably operates at the design rotational speed of fan section 12, and first turbine section 20 operates at a much higher rotational speed.

In accordance with a first embodiment of the present invention, engine 10 further includes fan drive shaft means for rotating the fan section. As shown in FIG. 1 by way of example and not limitation, the fan drive shaft means comprises a fan drive shaft 24 coupled to fan section 12. Fan drive shaft 24 may be directly connected to the hub of fan section 12 to rotate fan section 12 as shaft 24 is turned.

In accordance with the present invention engine 10 further includes means for coupling the fan drive shaft means to the second turbine section of the fan drive turbine means to turn the fan section at substantially the same rotational speed as the second turbine section. In the first embodiment of the present invention described herein, the coupling means comprises a direct connection of shaft 24 to a drum 26 of second turbine section 22. Thus, in the first embodiment of the present invention the fan section 12 is directly driven at the same rotational speed as second turbine section 22.

In accordance with the present invention, engine 10 further includes gear means for coupling the first turbine section of the fan drive turbine means to the fan drive shaft means and for reducing the rotational speed of the power delivered by the first turbine section to match the rotational speed of the fan section. In the first embodiment of the present invention described herein, the gear means includes a gear box 28 disposed aft of core section 16. Gear box 28 is coupled to a drum 30 of first turbine section 20 as illustrated by lines 32 in any conventional manner, and is in turn coupled to shaft 24 to transfer the output of first turbine section 20 to shaft 24. Gear box 28 also serves to reduce the rotational speed of the power delivered by the first turbine section 20 to match the rotational speed of fan section 12.

With the configuration of turbofan engine 10 as described above and illustrated in FIG. 1, second turbine section 22 is directly connected to fan section 12 via shaft 24 to drive fan section 12 at the same rotational speed as second turbine section 22. First turbine section 20 is drivingly connected to fan drive shaft 24 via gear box 28. In this manner, the required number of stages of fan drive turbine 18 may be reduced since second turbine section 22 is directly coupled to fan section 12 without the requirement for gearing between second turbine section 22 and fan section 12. Furthermore, since only a portion of the shaft horsepower of shaft 24 is provided by first turbine section 20 through gear box 28, the overall weight and size of gear box 28 within the engine 10 may be substantially reduced as compared to prior art configurations which require that the gearing between the fan drive turbine and the fan drive shaft transfer the entire shaft horsepower.

Preferably, the shaft horsepower of fan drive shaft 24 is split substantially evenly between first turbine section 20 and second turbine section 22. It is further preferable for design considerations that the rotational speed of first turbine section 20 be about twice that of the rotational speed of second turbine setion 22. The speed of first turbine section 20 will be limited by the blade stress in the last stage. This arrangement provides several advantages over prior art arrangements. Specifically, the blade stresses in second turbine section 22 are kept relatively low since second turbine section 22 is designed to operate at the same low rpm as the large diameter fan section 12. The work extraction per stage of first turbine section 20 and the efficiency of each stage are relatively high due to the much higher rotational speed and blade velocity of first turbine section 20 as compared to second turbine section 22. The shaft horsepower output from gear box 28 is reduced since gear box 28 only transmits that part of the shaft horsepower provided by first turbine section 20. Furthermore, first turbine section 20 may work as a transition duct to second turbine section 22 to guide the hot products of combustion from the core section out to the greater diameter second turbine section 22. This configuration permits the engine to be shorter since first turbine section 20 serves the dual purposes of providing drive power to the fan section and also providing a transition duct to the larger diameter second turbine section 22. Finally, heat addition to the lubrication oil of gear box 28 will be reduced since gear box 28 only transmits a portion of the shaft horsepower to fan drive shaft 24 thereby reducing the weight and cooling requirements of the lubricating oil cooling system.

Figure 2:
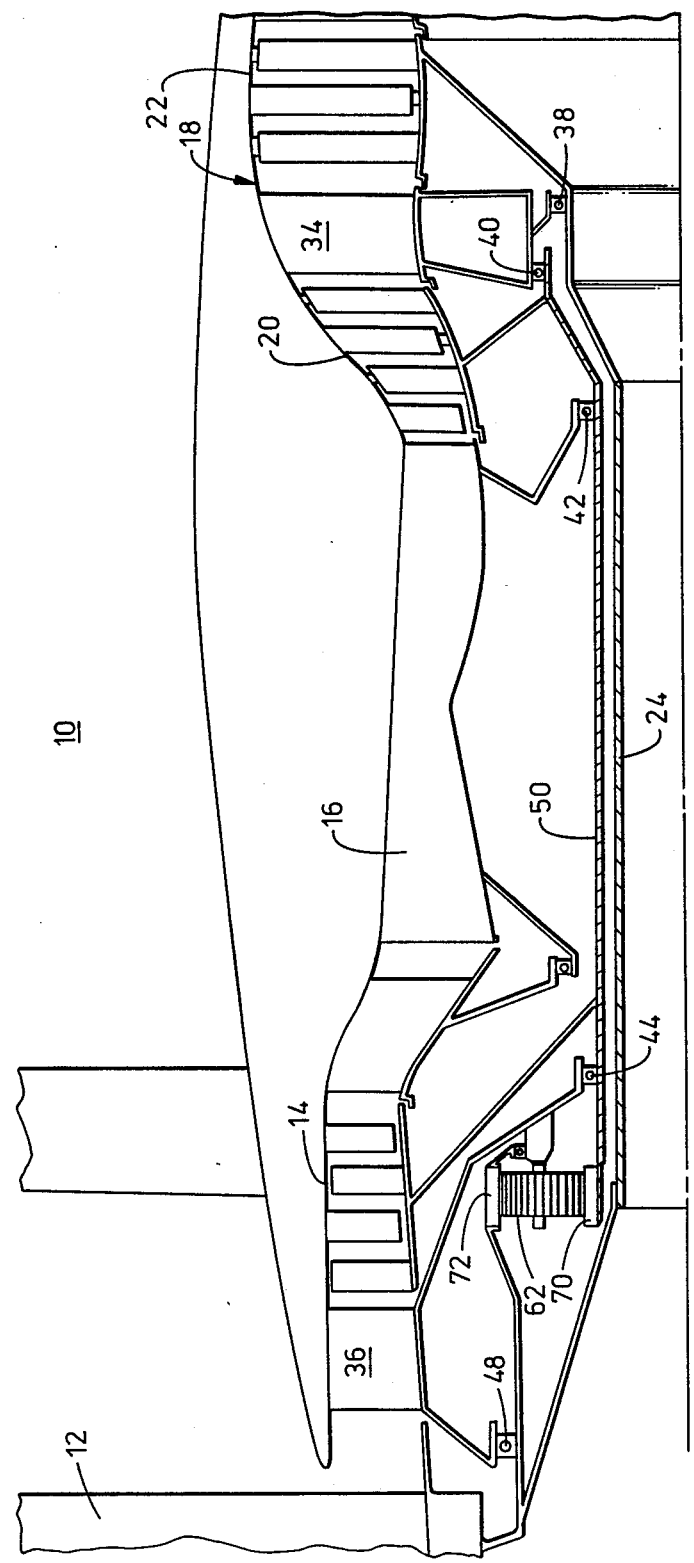
FIG. 2 schematically illustrates a turbofan engine incorporating the teachings of the present invention wherein the gear means coupling the first turbine section of the fan drive turbine to the fan section is disposed forward of the core section, and wherein a booster compressor is directly driven via a shaft extending between the first turbine section and the gear means.

FIG. 2 illustrates a second configuration of engine 10 of FIG. 1, wherein the gear means, comprised in this instance of a star gear 62, is disposed forward of core section 16. Reference numerals 34 and 36 illustrate respective frames and guide vanes of fan drive turbine 18 and booster compressor 14. The forward location of gear 62 in this embodiment of the present invention provides the following advantages. First, less torque is transmitted through core section 16 of engine 10 since first turbine section 20 remains at a high rpm and low torque until after that power is transmitted across the core section. Second, gear box 62 is placed in a cooler region of engine 10 forward of core section 16 and thus requires less cooling oil. Third, access for maintenance purposes of gear 62 is enhanced since it is positioned forward of core section 16. Fourth, the gear horsepower requirements are reduced since the booster drive power is not transmitted through the gear. Finally, this configuration is usable with modest pressure ratio cores since the booster can operate at high RPM compared to the fan and hence efficiently provide substantial pressure rise (core supercharging) in a few stages.

With continued reference to FIG. 2, booster compressor 14 is directly driven from first turbine section 20 via a booster drive shaft means comprised of a shaft 50. Shaft 50 comprises the outer shaft of a twin spool, and shaft 24 comprises the inner shaft of the twin spool as will be readily appreciated by those skilled in the art. Inner shaft 24 is supported on bearings 38 and 48, and outer shaft 50 is supported on bearings 40, 42, and 44.

In this embodiment, means for coupling first turbine section 20 to booster compressor 14 is provided by directly connecting booster drive shaft 50 to the hub of booster compressor 14. This embodiment of the present invention as illustrated in FIG. 2 provides the advantage wherein booster compressor 14 is driven at the same high rotational speed as first turbine section 20 thus permitting booster section 14 to have fewer stages while still generating sufficient work such that the present invention will work with modest pressure ratio cores. As illustrated, the coupling means between first turbine section 20 and booster compressor 14 does not go through gear 62 thus conserving any losses in shaft horsepower associated with transmission through gears. Booster shaft 50 is also connected to an input shaft 70 of star gear 62. An output shaft 72 of star gear 62 is in turn connected to fan section 12. Thus, the output of first turbine section 20 is split between booster 14 and fan 12.

Figure 3:
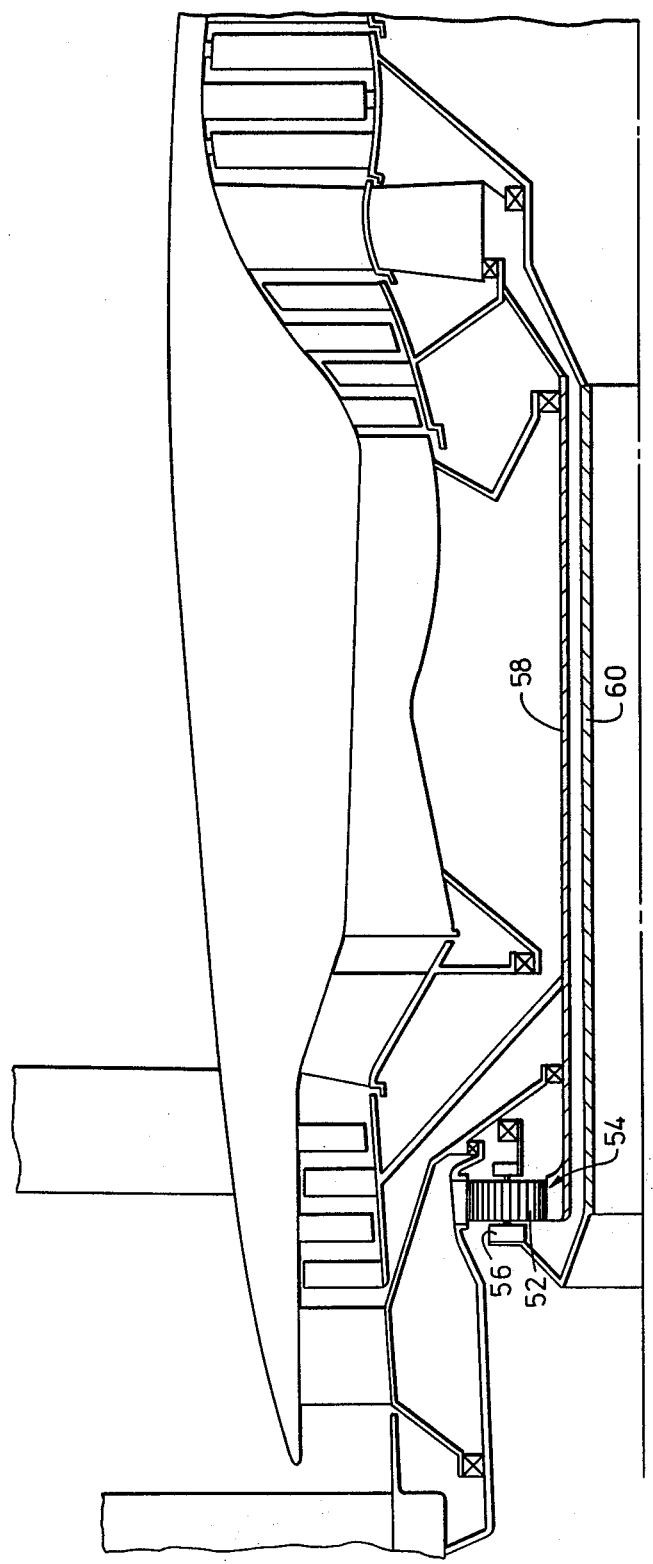
FIG. 3 illustrates a second embodiment of the present invention wherein the first and second sections of the fan drive turbine are coupled to the fan section via a differential planetary gear comprising the gear means and the means for coupling the second turbine section to the fan section.

With reference to FIG. 3, in a third embodiment of the present invention, the gear means includes a differential planetary gear 52 which comprises, in combination, the means for coupling second turbine section 22 to fan section 12, and the gear means for coupling first turbine section 20 to fan section 12. In this embodiment, differential planetary gear 52 includes a sun wheel 54 and a Planet carrier 56. The fan drive shaft means is again configured as a twin spool arrangement having outer and inner concentric rotating shafts 58 and 60, respectively, with outer shaft 58 being connected to the hub of first turbine section 20, and inner rotating shaft 60 being connected to the hub of second turbine section 22. Outer drive shaft 58 from first turbine section 20 is then connected to sun wheel 54, and inner rotating shaft 60 is connected to planet carrier 56. The specific configuration of differential planetary gear 52 and also star gear 62 are conventional and will be well understood by those skilled in the art. A specific description of the configuration of a star gear, such as star gear 62, and a differential planetary gear, such as differential planetary gear 52, are described in the reference "Handbook of Practical Gear Design" by Darle W. Dudley, copyright 1984 by McGraw Hill.

The alternative embodiment of the present invention illustrated in FIG. 3 and incorporating the differential planetary gear 52 provides the advantage of being able to slightly modify the rotational speed of second turbine section 22 to thereby provide the designer with some latitude in specifying the specific speed of second turbine section 22 while still matching the optimum design speed of fan section 12.

Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A high bypass ratio turbofan engine, comprising:
   a fan section;
   fan drive turbine means, for driving said fan section, said fan drive turbine means including first and second turbine sections mounted for independent rotation;
   fan drive shaft means for rotating said fan section;
   means for coupling said fan drive shaft means to said second turbine section of said fan drive turbine means to turn said fan section at substantially the same rotational speed as said second turbine section; and
   gear means for coupling said first turbine section of said fan drive turbine means to said fan drive shaft means and for reducing the rotational speed of the power output from said first turbine section to match the rotational speed of said fan section.

2. The turbofan engine of claim 1, wherein the shaft horsepower of said fan drive shaft means is split substantially evenly between said first and second turbine sections by said gear means.

3. The turbofan engine of claim 1, wherein the rotational speed of said first turbine section is set to about twice the rotational speed of said second turbine section by said gear means.

4. The turbofan engine of claim 1, including a core portion disposed forward of said fan drive turbine means relative to the flow of combustion gases through the engine, and said gear means being disposed aft of said core portion.

5. The turbofan engine of claim 1, including a core portion disposed forward of said fan drive turbine means relative to the flow of combustion gases through the engine, and said gear means being disposed forward of said core portion.

6. The turbofan engine of claim 1, including:
   a core portion disposed forward of said fan drive turbine means relative to the flow of combustion gases through the engine;
   a booster compressor disposed forward of said core portion; and
   booster drive shaft means for coupling said first turbine section to said booster compressor to turn said booster compressor at the same rotational speed as said first turbine section.

7. The turbofan engine of claim 1, wherein said gear means comprises a star gear.

8. The turbofan engine of claim 1, wherein said fan drive shaft means is configured as a twin spool having inner and outer rotating shafts operably connected to respective ones of said first and second turbine sections.

9. The turbofan engine of claim 8, wherein said coupling means and said gear means, in combination, include a differential planetary gear having a plant carrier and a sun wheel, one of said inner and outer shafts of said fan drive shaft means connected to said first turbine section being coupled to said sun wheel, and the other of said inner and outer shafts being coupled to said planet carrier.

10. A high bypass ratio turbofan engine, comprising:
   a fan section;

a booster compressor disposed aft of said fan section relative to the flow of combustion gases through the engine;

a core portion disposed aft of said booster compressor;

fan drive turbine means for driving said fan and booster sections, said fan drive turbine means including first and second turbine sections mounted for independent rotation;

fan drive shaft means for rotating said fan section;

booster drive shaft means for rotating said booster compressor;

means for coupling said fan drive shaft means to said second turbine section to turn said fan section at substantially the same rotational speed as said second turbine section;

means for coupling said booster drive shaft means to said first turbine section to turn said booster compressor at substantially the same rotational speed as said first turbine section; and gear means for coupling said first turbine section to said fan drive shaft means and for reducing the rotational speed of the power delivered by said first turbine section to match the rotational speed of said fan section.

11. The turbofan engine of claim 10, wherein said gear means is disposed aft of said core portion.

12. The turbofan engine of claim 10, wherein said gear means is disposed forward of said core portion.

13. The turbofan engine of claim 10, wherein said gear means comprises a star gear.

14. The turbofan engine of claim 10, wherein said fan drive shaft means and said booster drive shaft means comprise concentric inner and outer shafts, respectively, arranged as a twin-spool.

15. The turbofan engine of claim 14, wherein said gear means and said means for coupling said second turbine section to said fan drive shaft means, in combination, include a differential planetary gear having a planet carrier and a sun wheel, said inner shaft being connected to said first turbine section and said outer shaft being connected to said planet carrier.

* * * * *